Sept. 30, 1958　　　M. BERCHTOLD ET AL　　　2,853,987
DIESEL ENGINE SUPERCHARGED BY THE AERO-DYNAMIC WAVE MACHINE
Filed Sept. 19, 1957　　　　　　　　　　2 Sheets-Sheet 1

INVENTORS
MAX BERCHTOLD
ERNST NIEDERMANN
BY
ATTORNEYS

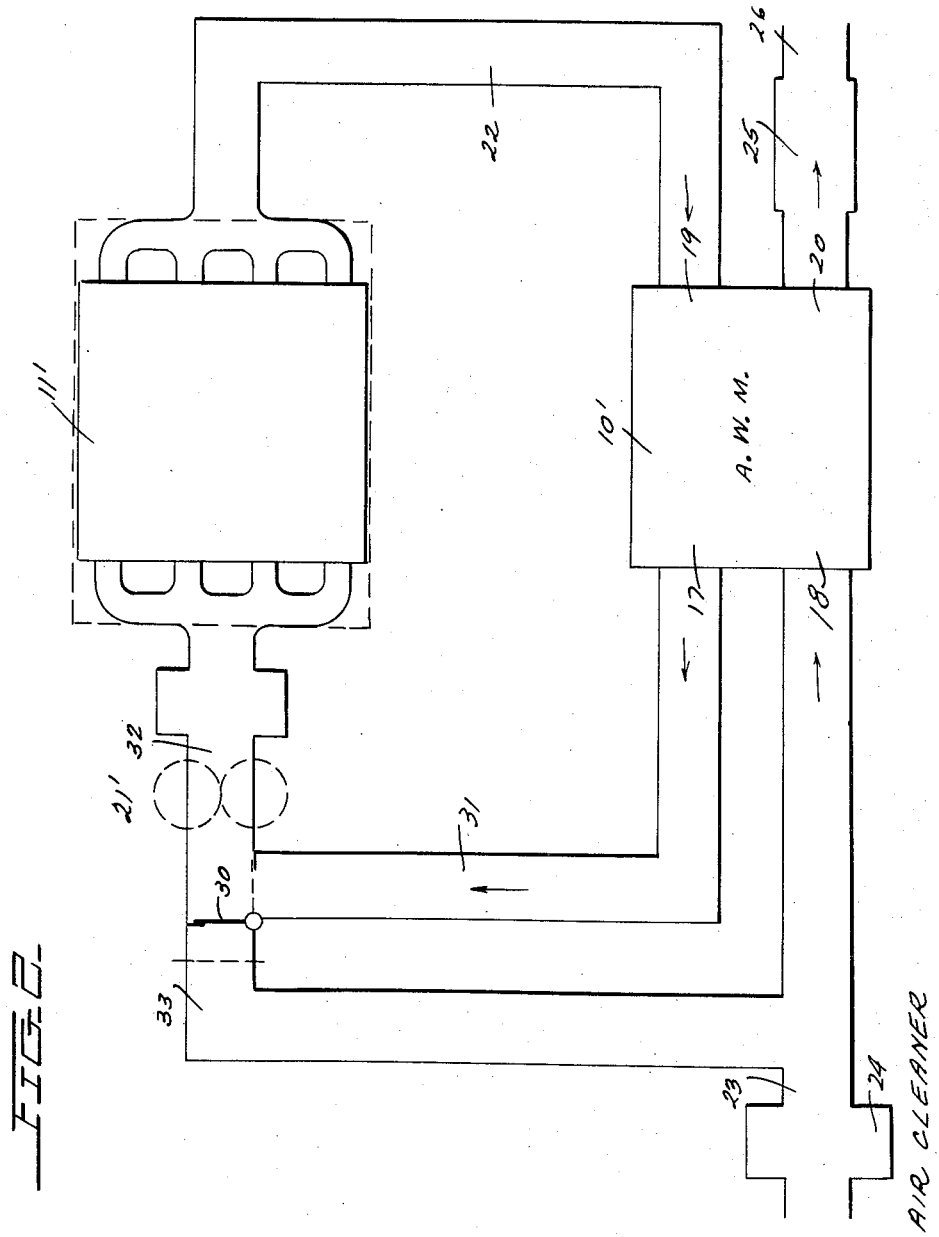

United States Patent Office 2,853,987
Patented Sept. 30, 1958

2,853,987

DIESEL ENGINE SUPERCHARGED BY THE AERO-DYNAMIC WAVE MACHINE

Max Berchtold, Paoli, Pa., and Ernst Niedermann, Zurich, Switzerland, assignors to I-T-E Circuit Breaker Company, Philadelphia, Pa., a corporation of Pennsylvania Application September 19, 1957, Serial No. 684,937

6 Claims. (Cl. 123—119)

Our invention relates to controls for an aero-dynamic wave machine used as a supercharger for a reciprocating machine such as a diesel engine and more particularly is directed to a novel arrangement whereby modification by automatic means of this system is achieved during starting, idling and low load operation.

When an aero-dynamic wave machine is utilized as a supercharger for a reciprocating engine both maximum efficiency and increased power is achieved by utilizing the hot gas exhaust of the reciprocating engine as an input to the wave machine. It is possible to properly design an aero-dynamic wave machine for maximum efficiency for some load conditions of the reciprocating engine. However, the pressure produced by the wave machine is dependent upon the temperature of the exhaust gases from the reciprocating engine. Thus, when the reciprocating engine is either being started, idling or operating under low load conditions it is possible that the temperature of the exhaust gases have dropped to such a low temperature that it is impossible to maintain an adequate pressure at the pick-up port of the wave machine to supply the engine with the necessary massflow of air. That is; the massflow balance required for the aero-dynamic wave machine is upset resulting in incomplete low pressure scavenging and overcomplete high pressure scavenging of the wave machine. As a result of this the hot diesel exhaust gas will pass through the rotor of the aero-dynamic wave machine, through the pickup port thereof back to the reciprocating engine. This recirculation of hot gas into the reciprocating engine can result in incomplete combustion and possible stalling of the reciprocating engine. It is this disadvantage which the instant invention is designed to overcome.

At the outset, it should be noted that there presently exists aero-dynamic wave machines utilizing reverse cycle operation such as described in copending applications, Serial No. 647,091, filed March 19, 1957, by Ernst Niedermann entitled "Reverse Cycle Aerodynamic Wave Machine" and Serial No. 637,570, filed January 13, 1957, by Max Berchtold entitled "Reverse Cycle Aerodynamic Wave Engine." These reverse cycle machines permit a range of variable pressure ratio and a range of variable massflow within which the wave machine operates without undesirable recirculation of hot gas. However, this limitation in the range of operation of the machines may be exceeded when the reciprocating engine is idling or operated under low load conditions. In this case the receiving compression wave created at the opening corner of the pickup port becomes an expansion wave which means that the pressure in the pick-up port falls below the pressure in the nozzle port and also possibly below the pressure in the exhaust port. This results in too low a pressure in the rotor channel with the result that the hot gas in the rotor does not flow into the exhaust port and hence no fresh air is introduced into the rotor channels. Thus the hot gases remaining in the rotor are discharged into the pick-up port. When these hot gases from the pick-up port are delivered to the reciprocating engine, they result in starvation of the reciprocating engine and subsequent stalling.

This problem arises as a result of and is specific to the use of an aero-dynamic wave machine as a supercharger and does not occur in the prior art turbine-compressor combination. That is in these prior art systems the energy from the hot gas exhaust is initially transformed by means of a turbine to shaft power and is then transmitted by means of a compressor, to compressed air. In contradistinction the aero-dynamic wave machine has a direct exchange of energy from one gas to another, by exchanging the pressure of the cold air intake and hot gas intake. Thus, the instant invention arises solely because of the use of an aero-dynamic wave machine as a supercharger and furthermore is not needed nor applicable to a turbine compressor supercharger.

Basically, our invention provides an arrangement whereby a predetermined condition such as idling or low loading operation of the reciprocating engine, will cause the pickup port of the aero-dynamic wave machine to be fully or partially closed which may result in the opening of a direct connection from atmospheric condition to the reciprocating engine for aspirating air directly.

The method of achieving this is by providing a throttling valve in the intake manifold or channels leading thereto, of the reciprocating engine and in one embodiment further downstream there is a check valve connecting an ambient input to the intake manifold. During high load and high torque operation the throttling valve will be open and if there is a check valve it will be closed so that the compressed air leaving the aerodynamic wave machine through its pickup port flows without restriction through the intake manifold to the reciprocating engine. The exhaust gases from the reciprocating engine will be at a sufficiently high pressure and temperature to remain within the normal operating range of the aero-dynamic wave machine. However, when the reciprocating engine is either being started, idling or being operated under low load conditions the throttling valve is controlled in response to such parameters as the temperature of the gas in the exhaust manifold, the position of the fuel pump rack, the pressure at or the pressure differential between the pickup port and nozzle, etc. The closing of the throttling valve will restrict the flow of air from the aerodynamic wave machine to the reciprocating engine and thereby create and maintain a sufficiently high pressure at the pickup port of the aero-dynamic wave machine to create a receiving compression wave of variable intensity so that all of the reciprocating engine exhaust gases entering the aero-dynamic wave machine rotor are discharged into the exhaust port of the aero-dynamic wave machine to thereby induce sufficient fresh air into the rotor, thus placing the wave machine in proper condition to immediately supercharge the reciprocating engine when power is needed. In some embodiments this also permits natural aspiration of the reciprocating engine when the pressure in the intake manifold falls below the ambient pressure, thereby resulting in the automatic opening of the check valve as a result of the pressure differential.

Thus, with both of these conditions existing, namely the throttle valve closed and the check valve opened, the reciprocating engine is receiving air at ambient pressure. However, as soon as the load or torque requirements of the reciprocating engine are increased the throttle valve will be responsive to this condition and will automatically open thereby both immediately supplying high pressure, clean air to supercharge the reciprocating engine and in one embodiment create a sufficient pressure difference to result in the closing of the check valve. Thus, normal high load operation is readily and rapidly resumed, It should be noted that the control means of our invention prevents hot gases from being supplied or entering the reciprocating engine by closing off or by-passing the aero-dynamic wave machine. However, the conditions under which it is necessary for the control circuit to close or by-pass the supercharger exists only when the reciprocating engine is either idling or operating under low load conditions. At these conditions the reciprocating engine does not need supercharging and therefore it is not objectionable to cut out or by-pass the supercharger as provided for in our invention. Thus, basically, we have provided an arrangement in which the output of the aero-dynamic wave machine is closed when the reciprocating engine is operated under low load conditions and opened when operating under high load conditions.

If an embodiment is used in which the throttle valve is completely closed, it is necessary to provide an alternate source of air for the reciprocating engine. This is achieved by means of the check valve connecting ambient air to the intake manifold. Thus the reciprocating engine must create a suction in the intake manifold to cause a sufficient pressure differential with the ambient pressure to open the check valve. With this embodiment our invention can be used with a 4-stroke reciprocating engine where the suction action is inherent. When a supercharged 4-stroke engine has a split manifold such as shown in copending application Serial No. 458,771, filed September 28, 1954, by Max Berchtold entitled "Aerodynamic Wave Machine as a Supercharger for Reciprocating Engines," assigned to the assignee of the instant application, it is possible that there will be sufficient utilization of energy to permit operation during starting, at idling or low load conditions without throttling valve of our instant invention. However, in some installations it may nevertheless be desirable to adapt the split manifold arrangement with the throttle arrangement of our instant invention to thereby supplement the desirable features of the split manifold arrangement during starting, idling or low load operation. When our invention is used with a 2-stroke engine having a scavenging blower, the pressure differential required for opening the check valve is created by the scavenging blower rather than the suction stroke of a 4-stroke engine.

In copending application Serial N. 458,771, there is shown and described a split manifold arrangement for 2-stroke engines which eliminates the necessity for a scavenging blower. As noted our invention cannot be used on a 2-stroke engine which does not have a scavenging blower. Thus, there is no advantage to have throttling valve of our invention in a 2-stroke engine except possibly for starting.

It should be noted that many modifications and improvements of the general concept of the invention are possible. For example, the throttle valve and the check valve could be combined into a single 2-way valve so that in one position it blocks the flow from the supercharger into the intake manifold while permitting a clear channel from ambient air through the intake manifold to the reciprocating engine and in a second position reverses the above condition.

In one embodiment of our invention there is an instantaneous opening and closing of the throttle valve on the occurrence of any one of a number of predetermined conditions which are either a cause or effect of low load operation such as the exhaust temperature, the pickup port pressure, the nozzle pressure, the pressure differential between nozzle and pickup port, the fuel pump rack position, etc. It is furthermore noted that this determined condition can be transmitted to operate the throttle valve in any one of the prior art methods as for example by an electrical signal, hydraulic means, pneumatic system, or a direct mechanical linkage.

It has been found that the throttle valve should be closed or opened at approximately the same torque regardless of engine speed and that this constant torque is best represented by the fuel pump rack position. Thus, in order to control the throttle valve, a sensing element, such as a switch, a hydraulic valve, an in-valve or a mechanical linkage will be operated at a predetermined fuel pump rack position, the resulting condition, such as an electric current, oil pressure, or air pressure, will operate the throttle valve by means of a solenoid, piston, diaphragm, bellows, or mechanical linkage. Thus this arrangement of using the fuel pump rack position has the advantage of a single control parameter which directly represents the torque of the reciprocating engine.

With further improvements of the A. W. M. it might be possible to use the butterfly valve and bypass the valve solely for starting and very low idling speeds. In this case, the oil pressure which is a function of the engine speed can be used to operate the butterfly valve.

Although an embodiment of our invention provides for either complete opening and complete closing of the throttle valve, another embodiment of our invention could utilize a controlled gradual operation of the throttle valve combined with possible elimination of both the check valve and second input to the intake manifold. That some installations may require a range of low load operation during which the throttle valve is only partially closed so that the aerodynamic wave machine remains within the permissible operating limitations such as those set up in copending U. S. applications, Serial No. 647,091, filed March 19, 1957, by Ernst Neidermann entitled "Reverse Cycle Aerodynamic Wave Machine" and Serial No. 637,570, filed January 31, 1957, by Max Berchtold entitled "Reverse Cycle Aerodynamic Wave Engine" by supplying a reduced massflow of compressed air to the reciprocating engine. Thus, the throttle valve is gradually moving toward closed position during decreasing load conditions, and gradually moved toward open position during increasing load conditions. In the event the check valve is to be eliminated, means are provided so that the throttle valve is never completely closed.

It should be noted that it is also possible to eliminate the check valve in an arrangement in which the throttle is instantly moved from a fully open to closed position if means are provided to allow sufficient air to pass from the aero-dynamic wave machine to the reciprocating engine by means of a by-pass for the throttle valve. Otherwise, the throttle valve should be only partially closed. Thus, the throttle valve can be controlled in the manner heretofore noted.

Accordingly, a primary objective of our invention is to provide a control arrangement for an aero-dynamic wave machine used as a supercharger for a reciprocating engine.

Another objective of our invention is to provide an arrangement wherein undesirable conditions existing during starting, idling and low load operation are prevented by providing a throttling means for an aero-dynamic wave machine supercharger.

A still further objective of our invention is to provide a control system containing a throttling valve in a supercharger arrangement which ensures sufficient scavenging of the supercharger and also provides a supply of air for the reciprocating engine during low load operation.

Another objective of our invention is the provision of control means to prevent the stalling of a reciprocating engine during low load operation.

A still further objective of our invention is to provide a single control valve which can either be instantaneously or gradually operated in response to load conditions of a reciprocating engine to thereby control the aero-dynamic machine supercharger output and prevent hot gases from entering the reciprocating engine.

Another object of our invention is to provide a throttle valve arrangement for a wave machine supercharged reciprocating engine which can be used with or without an exhaust manifold on either a two or four-stroke engine.

Still another object is the provision of a throttle and check valve arrangement which are coordinated to control the supercharging of a reciprocating engine by an aerodynamic wave machine.

Still another object of our invention is to provide a combined throttling and check valve wherein the throttling valve blocks the compressed air discharge of a wave machine supercharger during starting, idling and low load operation and the check valve connects ambient air to the reciprocating engine.

These and other objectives of our invention will be apparent from the following description when taken in connection with the drawings in which:

Figure 2 is a view illustrating a modified embodiment of Figure 1 in which the throttle and check valve are combined into a single unit. The dotted line illustrates the blower required in the event our invention is used on a two-stroke reciprocating engine rather than a four-stroke engine.

Figure 1:
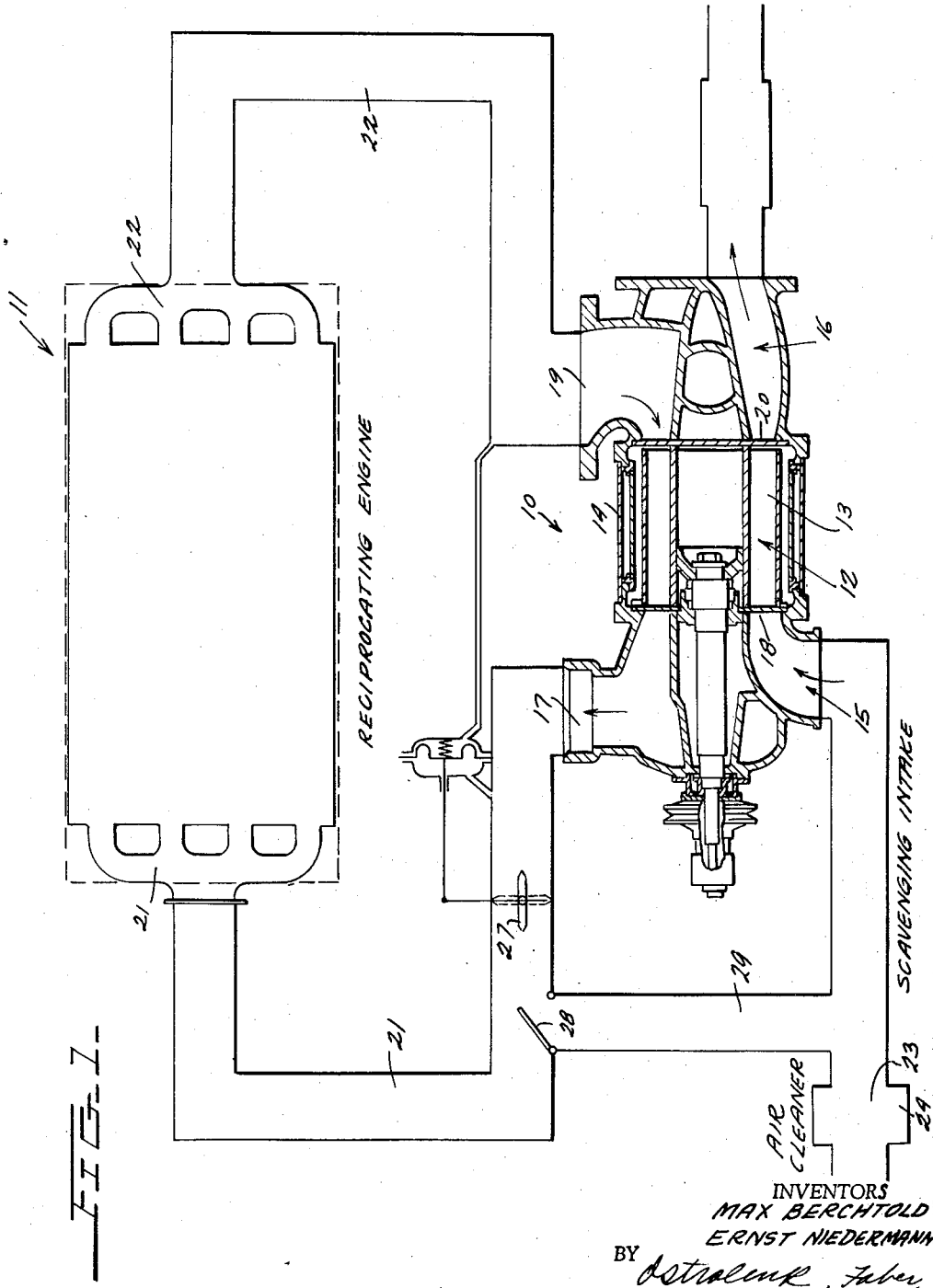
Figure 1 illustrates a reciprocating engine which is supercharged by an aero-dynamic wave machine and has the control means of our invention.

The aerodynamic wave machine 10 may be of the type and have the operation described in copending U. S. application Serial No. 454,774 filed September 8, 1954, by Max Berchtold entitled "Wave Engine" and assigned to the assignee of the instant invention in which there is a direct transformation of energy by unstationary flow phenomena between a hot gas and cold air inputs to the machine. It is further noted that the aero-dynamic wave machine 10 may have the modifications such as set forth in copending U. S. applications Serial No. 647,091, filed March 19, 1957, by Ernst Neidermann entitled "Reverse Cycle Aerodynamic Wave Machine" and, Serial No. 637,570 filed January 31, 1957, by Max Berchtold entitled "Reverse Cycle Aerodynamic Wave Engine," namely the reverse cycle of operation wherein all of the hot gases are confined to a first side of a machine and all of the cold gases substantially confined to the opposite side of the machine.

The aero-dynamic wave machine 10 in the illustration of Figure 1 is utilized as a supercharger for the reciprocating engine 11 which is, as will hereinafter be more fully explained, a 4-stroke reciprocating engine. The aero-dynamic wave machine 10 has a rotor 12 having a plurality of channels 13 closed off by an outer case 14 and is straddled by stators 15 and 16. Appropriate openings are placed in the stators 15 and 16 to provide the intake flows and exhaust flows for the aero-dynamic wave machine. Thus, in the illustration the stator 15 has a pick-up port 17 and an intake port 18 and the stator plate 16 has an inlet nozzle 19 and an exhaust port 20. The pick-up port 17 is connected to the reciprocating engine 11 by means of the intake manifold 21 and the exhaust from the reciprocating engine 11 is supplied to the inlet nozzle 19 by means of the exhaust manifold 22. Thus, hot fluids exhausted from the reciprocating engine 11 are supplied through the exhaust manifold 22 through the inlet nozzle 19 to the aerodynamic wave machine 10 and simultaneously low pressure clean air is supplied, through the duct 23 and the air cleaner 24 to the inlet port 18.

Within the aerodynamic wave machine 10 there is an exchange of pressure between the hot gas and cold air so that the hot gas is exhausted through the exhaust port 20 and muffler 25 through the pipe 26 at a pressure equal to that of the air entering the wave machine 10 at inlet port 18 and fresh air is delivered by the aerodynamic wave machine 10 through the pick-up port 17 at the high pressure of the hot gases which entered at the inlet nozzle 19. Thus, the aerodynamic wave machine 10 by delivering high pressure clean air through the pick-up port 17 to the intake manifold 21 serves as a supercharger for the reciprocating engine 11 by utilizing the hot gases exhausted from the reciprocating engine 11 to the exhaust manifold 22.

Although the general arrangement of utilizing an aerodynamic wave machine as a supercharger for a reciprocating engine has been found to have many advantages over a turbine-compressor combination, it has been found that problems do exist during starting, idling and low load operation. That is, since there is a direct exchange of energy between the hot and cold gases without resorting to an in-between step of converting the energy to shaft power, the aero-dynamic wave machine is sensitive to temperature and pressure variations of the reciprocating engine exhaust gases. Thus, the aero-dynamic wave machine is usually designed for a predetermined mass flow range based on normal load operations of the reciprocating engine. However, when the reciprocating engine is being started, idling or operating under low load conditions, the massflow range of the aero-dynamic wave machine may be exceeded which will result over complete high pressure scavenging and incomplete scavenging of the wave machine. That is, the hot low pressure gases will be mixed with the cold air. A mixture of air and hot gas will be delivered through the pick-up port 17 to the intake manifold 21 and thereby starving and possible stalling of the reciprocating engine. By the utilization of a throttling valve 27, which is the essence of our instant invention, we will be able to overcome this disadvantage with automatic controls during starting, idling and low load operation. The throttling valve 27 can be of any well-known prior art structure, such as the butterfly type.

During normal load operation when the temperature and pressure of the exhaust gases of the reciprocating engine 11 are sufficient to provide the predetermined massflow range for the aero-dynamic wave machine 10, the throttle valve 27 in the intake manifold 21 will be open and the check valve 28 will be closed thereby permitting an unobstructed free flow of compressed clean air from the pick-up port 17 directly to the reciprocating engine 11. However automatic means, responsive either directly or indirectly to the load or torque conditions of the reciprocating engine 11, control the throttle valve 27 so that when the reciprocating engine 11 is started, idling or operating under low load conditions, the throttle valve 27 will be closed to thereby block the flow of air from the pick-up port 17 into the intake manifold 21 and therefore block the flow of compressed air to the reciprocating engine 11. The closing of the throttle valve 27 serves to create and maintain a sufficiently high pressure at the pick-up port 17 of the aero-dynamic wave machine 10 to create a receiving compression wave within the wave machine so that the hot gases within the rotor 12 are properly exhausted or discharged into the exhaust port 20 thereby creating sufficient suction to draw fresh air through intake duct 23 into the rotor channels 13. Thus the wave machine is in condition to immediately serve as a supercharger when the load increases. The closing of the throttle valve 27 permits the suction of the reciprocating engine 11 to drop the pressure within the intake manifold 21 to a magnitude below the ambient pressure existing in the intake duct 23 to thereby result in the automatic opening of the check valve 28 as a result of the pressure differential. Thus, at this time the reciprocating engine 11 will receive air at ambient pressure through the air cleaner 24, duct connection 29, past check valve 28, and into intake manifold 21 instead of from the pick-up port 17 of the aero-dynamic wave machine. Since the reciprocating engine 11 is operating at either idling or low load conditions, it does not require compressed air and hence will operate satisfactorily even though supplied by the low pressure ambient air flowing past the check valve 28.

As soon as the load or torque of the reciprocating engine 11 is increased, the throttle 27, responsive either directly or indirectly to this condition, will open to thereby immediately provide a supply of high pressure clean air through the intake manifold 21 to the reciprocating engine 11 and also create a sufficient pressure differential between the intake manifold 21 and the connecting duct 29 at ambient pressure to result in the closing of the check valve 28 so that normal load operation of the reciprocating engine 11 is readily resumed.

Thus, with our novel invention, we have provided an arrangement in which compressed air from an aero-dynamic wave machine, although normally supplied to the reciprocating engine, is closed when the reciprocating engine is started or operated under low load conditions to thereby prevent hot gases from being supplied to the reciprocating engine and possible stalling during this period of time.

As has previously been noted, during starting, idling and low load operation, the throttle valve 27 will be closed and the check valve 28 opens as a result of the pressure differential between the intake duct 23 and the intake manifold 21 resulting from the suction of the reciprocating engine 11. It is assumed that the reciprocating engine is a 4-stroke unit wherein the suction action is inherent.

In the event an aero-dynamic wave machine is used to supercharge on a 2-stroke reciprocating engine, our instant invention is only needed if a scavenging blower is necessary in the intake manifold 21. In this case the blower will create the necessary vacuum to operate the check valve 28 at the time the throttling valve 27 closes.

In Figure 1 we have shown the throttle valve 27 and the check valve 28 as two separate components. However, it should be noted that these valves could be combined in a single unit such as that illustrated in Figure 2 wherein the valves are combined into a single valve 30. Thus, when the combined valve 30 is in the solid position of Figure 2, there is a free flow of compressed air from the aero-dynamic wave machine 10 through the duct 31 and intake manifold 32 to the reciprocating engine 11. However, the combined valve 30, responsive either directly or indirectly to the load or torque conditions of the reciprocating engine 11, will be moved to the dotted position of Figure 2 when the reciprocating engine 11 is either operating under idling or low load conditions to thereby serve a dual function with its single movement, namely to close off the passage from the aero-dynamic wave machine 10 to the reciprocating engine 11 and at the same time open a free passage from the ambient air through air cleaner 24 and the tubing 33 directly to the reciprocating engine 11. Thus, in the event the arrangement illustrated in Figure 2 is utilized, it could be adapted for use on either a 2 or 4-stroke engine.

In one embodiment of our invention, the throttling valve 27 of Figure 1, or 30 of Figure 2, has an instantaneous opening or closing as a direct or indirect result of the change of the load operation of the reciprocating engine 11. There are a number of conditions which are the cause or effect of modified load operation of the reciprocating engine 11. Thus, the throttle valve 27 of Figure 1 or 30 of Figure 2 could be made responsive to any one of these conditions, as for example, the exhaust temperature in the exhaust manifold 22, the pressure at the pick-up port 17, the pressure at the nozzle 19, or the pressure differential between the pick-up port 17 and the nozzle 19, the fuel rack position of the reciprocating engine 11, etc. Any one of these conditions can be utilized to transmit a signal to the throttle valve 27 for operation thereof and this transmission of a change in condition could be any one of a number of well known prior art methods such as electrical, hydraulic, mechanical or pneumatic means.

In practice it has been found that for any given system the throttle valve 27 should be opened or closed at approximately a constant torque and that this constant torque is best represented by the fuel rack position of the reciprocating engine 11. The throttle valve 27 can sense the position of the fuel pump rack by means of a switch, a hydraulic valve, air valve, mechanical linkage; by means of electric current, oil pressure, air pressure, etc. which in turn could control the throttle valve 27 by means of a solenoid, a piston diaphragm or bellows, or mechanical linkage. Thus, by controlling the throttle valve 27 in accordance with the position of the fuel pump rack position it is possible to control the system by means which directly represents the torque of the reciprocating engine 11. It is noted, of course, that any one of the above noted means which are utilized for the control of the throttle valve 27 of Figure 1 could also be used for the control of the combination valve 30 of Figure 2.

The control means can be designed so that the throttle valve 27 or combined valve 30 remains closed for a given torque raise, in order to eliminate a continuous opening and closing for operation points near the critical torque.

Although our instant invention has been described primarily in connection with a throttle valve 27 or combination valve 30, which is instantaneously closed during idling and low load operation, it will be apparent to those skilled in the art, as set forth in the introduction of the instant application, that in some installations it may be desirable to provide a gradual control of the throttle valve over a given range of operation. That is the valve could be gradually moved toward closed position during decreasing load conditions and gradually moved toward open position during increased load conditions. Thus, when the reciprocating engine 11 is being operated at only slightly less than normal load conditions, the valve would be only partially closed thereby supplying a reduced mass flow to the reciprocating engine 11 to maintain the mass flow range of the aero-dynamic wave machine 10 such as described in copending applications, Serial No. 647,091, filed March 19, 1957, by Ernst Niedermann entitled "Reverse Cycle Aerodynamic Wave Machine" and Serial No. 637,570, filed January 13, 1957, by Max Berchtold entitled "Reverse Cycle Aerodynamic Wave Engine."

When the throttle valve 27 is modulated so that it never completely closes to the dotted position of Figure 1, it may be possible to eliminate the check valve 28 and therefore eliminate or continuously block off the duct 29. It is also possible that the check valve will only be needed for starting the reciprocating engine. It this case the butterfly will always maintain a pressure in the pickup port 17 equal or higher than the pressure at the nozzle 19. It is therefore advantageous to utilize the pressure differential between the pickup port pressure 17 and the nozzle 19 to control the butterfly valve. This can be accomplished directly or by a servomotor. An example of such an arrangement is shown in Figure 1. The air controlled actuator 30 is connected over the lines 34 and 35 with the pickup duct and the nozzle duct respectively. The membrane 31 separates the air chambers in which the differential pressure is maintained. The linkage 33 operates the butterfly as a function of the movement of the membrane. A spring 32 keeps the butterfly fully open until the differential falls below a predetermined value. The butterfly will start to close and will be fully closed when the pressure differential becomes zero. When the differential increases again the butterfly will open.

It should be noted that the check valve can also be eliminated in an arrangement in which the throttle valve 27 completely closes (to the dotted position at Figure 1). This can be achieved by providing a permanent by-pass for the throttle valve 27 so that a reduced mass flow of compressed air from aerodynamic wave machine 10 will continue to flow to the reciprocating engine, even though the throttle valve 27 is completely closed.

Thus, we have provided a novel arrangement whereby undesirable conditions existing during starting, idling or low load operation of a reciprocating engine supercharged by an aero-dynamic wave machine are prevented by providing a blocking means or bypass for the aero-dynamic wace machine during these low load conditions to thereby both prevent the stalling of the reciprocating engine and maintain a proper condition of the aero-dynamic wave machine so that it will be immediately effective to again serve as a supercharger as soon as normal load or torque conditions are resumed.

Although we have here described preferred embodiments of our novel invention, many modifications and variations will now be obvious to those skilled in the art and we prefer therefore to be limited, not by the specific description herein, but only by the appended claims.

We claim:

1. A control system for a supercharged reciprocating engine being comprised of an aero-dynamic wave machine, an intake manifold and an exhaust manifold for the reciprocating machine; said aero-dynamic wave machine having a pick-up port, an inlet nozzle, a scavenging port and an exhaust port; said pick-up port connected by said intake manifold to said reciprocating engine to thereby supply compressed air from said aero-dynamic wave machine to said reciprocating engine, said inlet nozzle connected by said exhaust manifold to said reciprocating engine to thereby permit exhaust gases from said reciprocating engine to be supplied to said aero-dynamic wave machine, a throttle valve operatively positioned within said intake manifold to thereby control the passage of compressed air from said aero-dynamic wave machine to said reciprocating engine; said throttle valve being responsive to load conditions of said reciprocating engine; said throttle valve being open when said reciprocating engine is operated under normal load conditions to thereby permit free passage of compressed air from said aero-dynamic wave machine through said intake manifold to said reciprocating engine; said throttle valve being closed when said reciprocating engine is operating under low and no load conditions to thereby block the passage of compressed air from said aero-dynamic wave machine through said intake manifold to said reciprocating engine.

2. A control system for a supercharged reciprocating engine being comprised of an aero-dynamic wave machine, an intake manifold and an exhaust manifold for the reciprocating machine; said aero-dynamic wave machine having a pick-up port, an inlet nozzle, a scavenging port and an exhaust port; said pick-up port connected by said intake manifold to said reciprocating engine to thereby supply compressed air from said aero-dynamic wave machine to said reciprocating engine, said inlet nozzle connected by said exhaust manifold to said reciprocating engine to thereby permit exhaust gases from said reciprocating engine to be supplied to said aero-dynamic wave machine, a throttle valve operatively positioned within said intake manifold to thereby control the passage of compressed air from said aero-dynamic wave machine to said reciprocating engine; said throttle valve being responsive to load conditions of said reciprocating engine; said throttle valve being open when said reciprocating engine is operated under normal load conditions to thereby permit free passage of compressed air from said aero-dynamic wave machine through said intake manifold to said reciprocating engine; said throttle valve being closed when said reciprocating engine is operating under low and no load conditions to thereby block the passage of compressed air from said aero-dynamic wave machine through said intake manifold to said reciprocating engine; a check valve in said intake manifold between said throttle valve and said reciprocating engine, said check valve being closed when said throttle valve is open and open when said throttle valve is closed.

3. A control system for a supercharged reciprocating engine being comprised of an aero-dynamic wave machine, an intake manifold and an exhaust manifold for the reciprocating machine; said aero-dynamic wave machine having a pick-up port, an inlet nozzle, a scavenging port and an exhaust port; said pick-up port connected by said intake manifold to said reciprocating engine to thereby supply compressed air from said aero-dynamic wave machine to said reciprocating engine, said inlet nozzle connected by said exhaust manifold to said reciprocating engine to thereby permit exhaust gases from said reciprocating engine to be supplied to said aero-dynamic wave machine, a valve operatively positioned within said intake manifold to thereby control the passage of compressed air from said aero-dynamic wave machine to said reciprocating engine; said valve being responsive to load conditions of said reciprocating engine.

4. A control system for a supercharged reciprocating engine being comprised of an aero-dynamic wave machine, an intake manifold and an exhaust manifold for the reciprocating machine; said aero-dynamic wave machine having a pick-up port, an inlet nozzle, a scavenging port and an exhaust port; said pick-up port connected by said intake manifold to said reciprocating engine to thereby supply compressed air from said aero-dynamic wave machine to said reciprocating engine, said inlet nozzle connected by said exhaust manifold to said reciprocating engine to thereby permit exhaust gases from said reciprocating engine to be supplied to said aero-dynamic wave machine, a valve operatively positioned within said intake manifold to thereby control the passage of compressed air from said aero-dynamic wave machine to said reciprocating engine; said valve being responsive to load conditions of said reciprocating engine; said valve being operatively positioned in response to load conditions of said reciprocating engine; said valve being moved to a first position when said reciprocating engine is operated under normal load conditions to thereby permit an unobstructed flow of compressed air from said aero-dynamic wave machine to said reciprocating engine, said valve being moved to a second position when said reciprocating engine is operating under low load conditions to thereby simultaneously block the passage of air from said aero-dynamic wave machine to said reciprocating engine and open a passage between ambient air and said reciprocating engine.

5. A control system for a supercharged reciprocating engine being comprised of an aero-dynamic wave machine, an intake manifold and an exhaust manifold for the reciprocating machine; said aero-dynamic wave machine having a pick-up port, an inlet nozzle, a scavenging port and an exhaust port; said pick-up port connected by said intake manifold to said reciprocating engine to thereby supply compressed air from said aero-dynamic wave machine to said reciprocating engine, said inlet nozzle connected by said exhaust manifold to said reciprocating engine to thereby permit exhaust gases from said reciprocating engine to be supplied to said aero-dynamic wave machine, a valve operatively positioned within said intake manifold to thereby control the passage of compressed air from said aero-dynamic wave machine to said reciprocating engine; said valve being responsive to load conditions of said reciprocating engine, said valve being open when said reciprocating engine is operated under normal load conditions to thereby permit free passage of compressed air from said aero-dynamic wave machine through said intake manifold to said reciprocating engine; said valve being closed when said reciprocating engine is operating under low or no load conditions to thereby block the passage of compressed air from said aero-dynamic wave machine through said intake manifold to said reciprocating engine.

6. A control system for a supercharged reciprocating engine being comprised of an aero-dynamic wave machine, an intake manifold and an exhaust manifold for the reciprocating machine; said aero-dynamic wave machine having a pick-up port, an inlet nozzle, a scavenging port and an exhaust port; said pick-up port connected by said intake manifold to said reciprocating gengine to thereby supply compressed air from said aero-dynamic wave machine to said reciprocating engine, said inlet nozzle connected by said exhaust manifold to said reciprocating engine to thereby permit exhaust gases from said reciprocating engine to be supplied to said aero-dynamic wave machine, a valve operatively positioned within said intake manifold to thereby control the passage of compressed air from said aero-dynamic wave machine to said reciprocating engine; said valve being responsive to load conditions of said reciprocating engine, said valve being open when said reciprocating engine is operated under normal load conditions to thereby permit free passage of compressed air from said aero-dynamic wave machine through said intake manifold to said reciprocating engine; said valve being closed when said reciprocating engine is operating under low or no load conditions to thereby block the passage of compressed air from said aero-dynamic wave machine through said intake manifold to said reciprocating engine, said valve being operatively positioned to block the flow of ambient air to the reciprocating engine when said valve is opened and to permit the flow of ambient air to the reciprocity engine when said valve is closed.

No references cited.